United States Patent
Lacaze et al.

(10) Patent No.: US 9,367,792 B2
(45) Date of Patent: Jun. 14, 2016

(54) SECURED DOCUMENT INCLUDING A RADIOFREQUENCY IDENTIFICATION DEVICE

(75) Inventors: Brigette Lacaze, Aubagne (FR); Blandine Alleysson, Aubagne (FR); Christophe Bousquet, La Seyne S/Mer (FR)

(73) Assignee: GEMALTO SA, Meudon (FR)

( * ) Notice: Subject to any disclaimer, the term of this patent is extended or adjusted under 35 U.S.C. 154(b) by 19 days.

(21) Appl. No.: 14/236,625

(22) PCT Filed: Jul. 19, 2012

(86) PCT No.: PCT/EP2012/064226
§ 371 (c)(1),
(2), (4) Date: Feb. 1, 2014

(87) PCT Pub. No.: WO2013/017429
PCT Pub. Date: Feb. 7, 2013

(65) Prior Publication Data
US 2014/0191046 A1    Jul. 10, 2014

(30) Foreign Application Priority Data
Aug. 2, 2011  (EP) .................................. 11306005

(51) Int. Cl.
*G06K 19/06*   (2006.01)
*G06K 19/077*  (2006.01)
*G06K 19/02*   (2006.01)

(52) U.S. Cl.
CPC ........ *G06K 19/07758* (2013.01); *G06K 19/025* (2013.01); *G06K 19/07728* (2013.01)

(58) Field of Classification Search
CPC ................... G06K 19/07749; G06K 19/07758
USPC .................................... 235/492, 385, 462.46
See application file for complete search history.

(56) References Cited

U.S. PATENT DOCUMENTS

| | | | |
|---|---|---|---|
| 7,847,698 B2 * | 12/2010 | Rancien et al. | 340/572.8 |
| 2006/0176181 A1 * | 8/2006 | Halope | 340/572.8 |
| 2010/0282855 A1 * | 11/2010 | Rancien et al. | 235/492 |

FOREIGN PATENT DOCUMENTS

| | | |
|---|---|---|
| DE | 10 2009 034896 A1 | 2/2011 |
| EP | 1 502 765 A1 | 2/2005 |
| EP | 2 050 580 A2 | 4/2009 |

OTHER PUBLICATIONS

PCT/EP2012/064226 International Search Report. Sep. 26, 2012, European Patent Office, P.B. 5818 Patentlaan 2 NL—2280 HV Rijswijk.

* cited by examiner

*Primary Examiner* — Daniel St Cyr
(74) *Attorney, Agent, or Firm* — The Jansson Firm; Pehr B. Jansson

(57) ABSTRACT

This invention relates to a secure document (1) comprising a substrate (7) integrating a radiofrequency identification device (11;13), the said substrate (7) comprising at least one slot (15).

7 Claims, 2 Drawing Sheets

SECURED DOCUMENT INCLUDING A RADIOFREQUENCY IDENTIFICATION DEVICE

BACKGROUND

1. Field of Invention

This invention relates to secure documents comprising a radiofrequency identification device, and particularly secure documents comprising a radiofrequency identification device with reinforced protection of the said radiofrequency identification device.

2. Description of Related Art

Contactless radiofrequency identification (RFID) devices are increasingly used to make documents secure, particularly by incorporating these RFID devices inside the document itself. A contactless RFID device is a device made up of an antenna and a chip connected to the terminals of the antenna. The chip is generally not powered and receives power through electromagnetic coupling between the antenna of the reader and the antenna of the RFID device; information is exchanged between the RFID device and the reader, particularly information stored in the chip, for example relating to the identification of the holder of the document or other types of information relating to the document on which the device is placed.

Thus, secure documents such as passports for example may incorporate RFID devices for identifying the holder of the document. In the case of a passport, the memory of the chip contains information such as the identity of the holder of the passport, their country of origin, their nationality, the visas of the different countries visited, entry dates, movement restrictions, biometric data etc.

The RFID device is generally manufactured independently from the document and is then incorporated by gluing between the cover and the bottom of the first page, for example, of the passport. The RFID device comprising the antenna and the chip connected to each other is then integrated into a substrate made of paper, plastic or other material (commonly called 'inlay').

Such documents are flexible documents and are subjected to twisting and bending stresses that can be withstood by the RFID device inserted in them without damage, providing the said stresses merely curve the document and the substrate. However, if the stresses are too great, the document is not sufficiently flexible and the curve can turn into a break or fold that can damage the RFID device. That is even more true when the document takes the form of a book like a passport, and thus has a more rigid binding system that can result in much easier folding or breaking if the bend is perpendicular to the said binding.

SUMMARY OF THE INVENTION

Thus, one of the aims of the invention is to provide a secure document comprising a radiofrequency identification device allowing improved protection of the said radiofrequency identification device if it is bent.

This invention thus relates to a secure document comprising a substrate integrating a radiofrequency identification device, the said substrate comprising at least one slot.

According to one aspect of the invention, the said at least one slot is made by incising the substrate close to the radiofrequency identification device.

According to another aspect of the invention, the length of the said at least one slot is greater than or equal to the size of the radiofrequency identification device.

According to another aspect of the invention, the length of the said at least one slot is smaller than the size of the radiofrequency identification device.

According to another aspect of the invention, the said at least one stress relief slot has the shape of a curve around the radiofrequency identification device.

According to another aspect of the invention, the secure document takes the form of a booklet with a hinge.

According to another aspect of the invention, the stress relief means are located between the hinge and the radiofrequency identification device.

According to another aspect of the invention, the secure document is an electronic passport.

BRIEF DESCRIPTION OF THE DRAWINGS

Other characteristics and benefits of the invention will become clearer in the description below, provided as an illustrative and non-limitative example, and the attached drawings, where.

Identical elements in the different drawings have identical reference numbers.

DETAILED DESCRIPTION

Figure 1A:
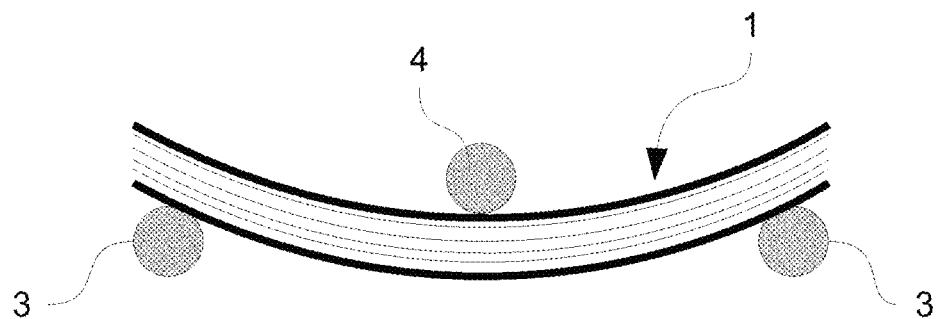
FIGS. 1a and 1b are schematic representations of the behaviour of the secure document depending on the bending stresses applied to it.
Figure 1B:
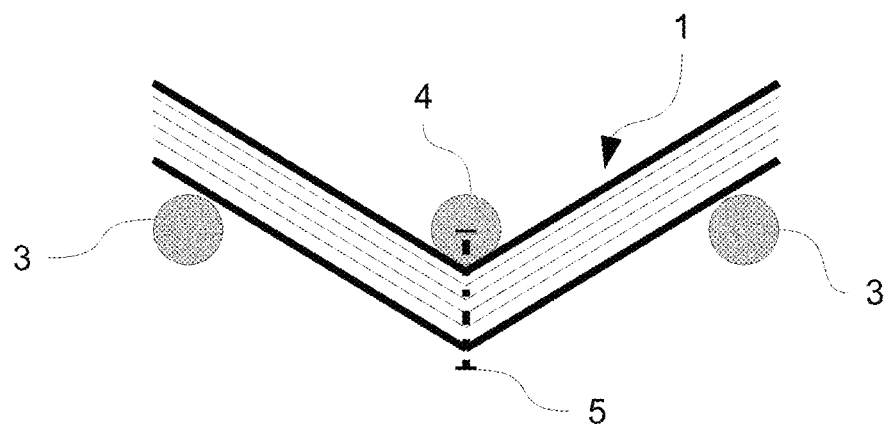

FIGS. 1a and 1b show the behaviour of a secure document 1 that takes the form of a booklet, depending on the bending stresses. The secure document 1 is supported by two pins 3 and pressure is applied by pin 4.

In FIG. 1a, the pressure applied by the pin 4 is less than the deformation tolerance of the secure document 1 and the document merely bends.

In FIG. 1b, the pressure applied by the pin 4 is greater than the deformation tolerance of the secure document 1 and the document breaks or folds 5. A fold 5 may also be formed by the repeated application of pressure below the deformation tolerance of the secure document 1.

Figure 2A:
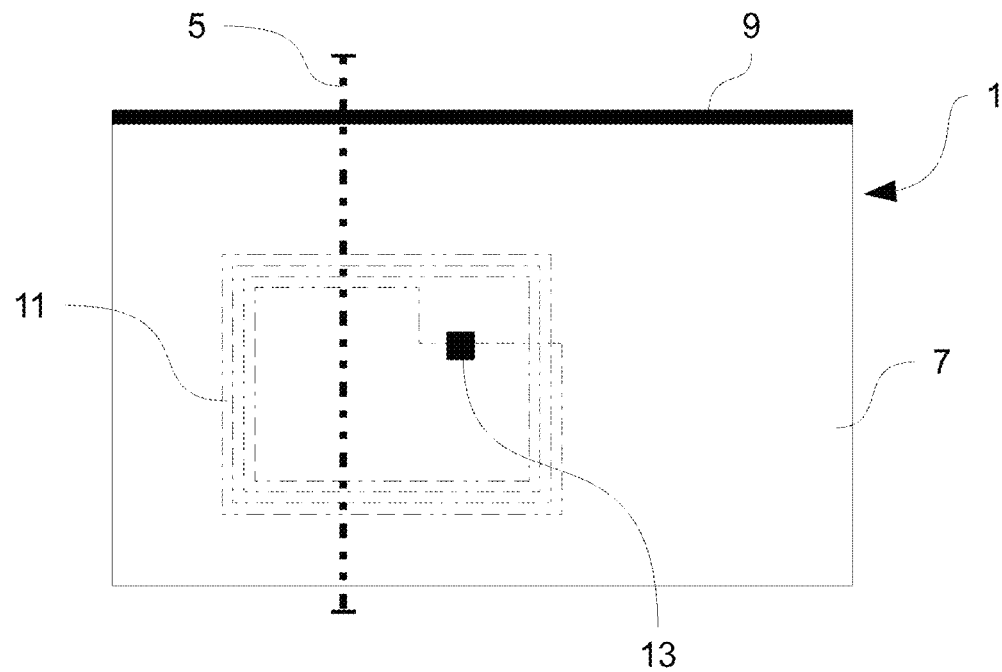
FIGS. 2a and 2b are schematic representations of the top view of the behaviour of the bend of a secure document with and without the subject of the invention.

FIG. 2a shows the effect of such a fold 5 if the secure document 1 takes the form of a booklet, with a hinge 9.

The fact that the secure document 1 has a hinge 9 reduces its tolerance to deformation in the case of bending stresses perpendicular to the said hinge 9, resulting more easily in a fold 5.

If the secure document 1 has a contactless radiofrequency identification device (RFID device) 11; 13, integrated into a substrate 7 well known to the person of the art, the fold 5 could go through the antenna 11 or the electronic chip 13 and damage them or even cut the antenna 11 and put the RFID device 11;13 out of order.

An example of a secure document 1 may be an electronic passport that uses the technology of RFID devices integrated into the cover to store data on the processor of the said electronic passport.

Figure 2B:
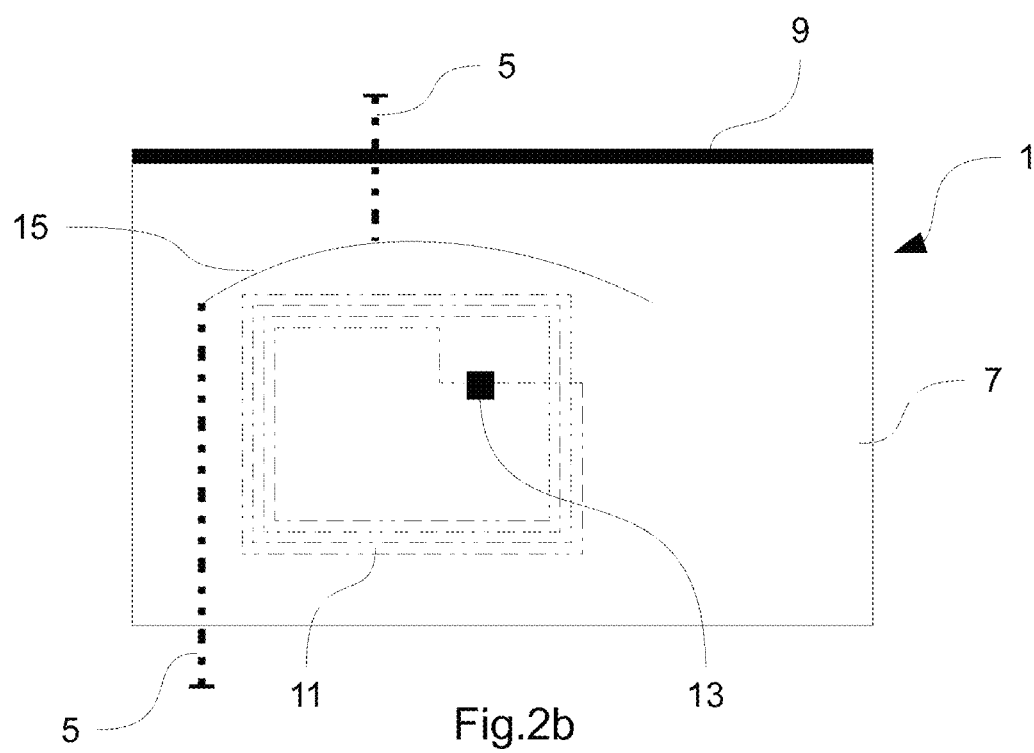

FIG. 2b shows a secure document 1 similar to that presented in FIG. 2a, that is in the form of a booklet with a hinge 9 and an RFID device 11;13 integrated into a substrate 7.

The secure document 1 here has at least one slot 15 on the substrate 7 that makes it possible to relieve the stresses applied by the fold 5 and thus divert the fold 5 to protect the RFID device.

Figure 3:
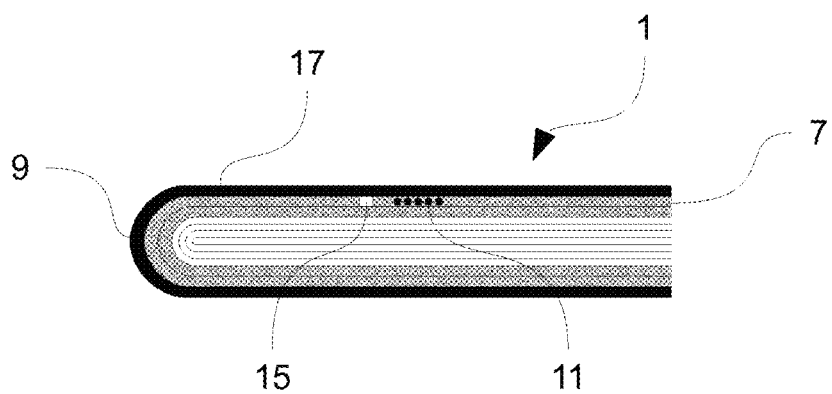
FIG. 3 is a schematic representation of a sectional view of a secure document according to the invention.

The slot 15 is preferentially made by incising the substrate 7 near the RFID device 11;13. FIG. 3 illustrates this case, showing a sectional view of a schematic representation of a secure document 1 such as an electronic passport, with a substrate 7 integrating an RFID device 11;13 and a slot 15 made in the said substrate 7, and a cover 17.

The slot 15 may be of several types; it may go through the substrate 7 entirely or only represent a reduction in the thickness of the said substrate 7 that is sufficient to make up an area of weakness in which the fold 5 can be guided.

The slot 15 may also be continuous over its entire length or only be made up of a series of small dotted incisions that make up an area of weakness in which the fold 5 can be guided.

In order to protect the RFID device 11;13, the slot 15 may particularly be placed between the hinge 9 and the RFID device 11;13 since the said hinge 9 is the portion of the secure document 1 with the least tolerance to deformation and is thus the most liable to give rise to a fold 5.

In order to divert the fold 5 more effectively, the slot 15 may preferentially have a curved shape around the RFID device 11;13 as shown in FIG. 2b and in order to protect the said RFID device 11;13 most effectively, the length of the said stress relief slot 15 may preferentially be greater than or equal to the size of the RFID device 11;13. The size of the RFID device 11;13 means both its length or its width.

Of course, the length of the slot 15 may also be smaller than the size of the RFID device 11;13, for example when the RFID device is located close to the edges of the secure document 1 perpendicular to the hinge 9 and where it is necessary to divert a fold 5 only over a small length in order to protect the said RFID device 11;13.

The slot 15 may also have shapes different from that of the curve shown in FIG. 2b. For example, the said slot 15 may also be straight, parallel or oblique in relation to the RFID device 11;13 or have a break angle over its length demarcating two portions each directed on one side of the said RFID device 11;13.

Further, any one secure document 1 may contain one or more slots 15 arranged parallel to each other.

Thus, it can be seen that the secure document with at least one slot makes it possible to divert a fold around an RFID device to protect the RFID device, where the said fold would otherwise have damaged the said RFID device and put it out of order.

The invention claimed is:

1. A secure document comprising a hinge and a substrate having at least one stress relief slot; and a radiofrequency identification device, wherein said stress relief slot is placed between said hinge and said radiofrequency identification device and is shaped to divert folds applying to said hinge away from said radiofrequency identification device so as to protect said radiofrequency identification device.

2. The secure document according to claim 1, wherein the said at least one stress relief slot is an incision in the substrate near said radiofrequency identification device.

3. The secure document according to claim 1, wherein the length of the said at least one stress relief slot is greater than or equal to the size of said radiofrequency identification device.

4. The secure document according to claim 1, wherein the length of the said at least one stress relief slot is smaller than the size of said radiofrequency identification device.

5. The secure document according to claim 1, wherein the said at least one stress relief slot is shaped to curve around said radiofrequency identification device.

6. The secure document according to claim 1, wherein the said at least one stress relief slot is located between said hinge and said radiofrequency identification device.

7. The secure document according to claim 1, wherein the said secure document is an electronic passport.

* * * * *